United States Patent
Marsnik et al.

(10) Patent No.: US 9,117,057 B2
(45) Date of Patent: Aug. 25, 2015

(54) IDENTIFYING UNUTILIZED OR UNDERUTILIZED SOFTWARE LICENSE

(75) Inventors: Jamie Beth Marsnik, Minneapolis, MN (US); Omkar Ashok Nalamwar, Irvine, CA (US); Thomas Martin Smalley, Boulder, CO (US)

(73) Assignee: International Business Machines Corporation, Armonk, NY (US)

( * ) Notice: Subject to any disclaimer, the term of this patent is extended or adjusted under 35 U.S.C. 154(b) by 1674 days.

(21) Appl. No.: 11/157,397

(22) Filed: Jun. 21, 2005

(65) Prior Publication Data

US 2006/0287960 A1     Dec. 21, 2006

(51) Int. Cl.
   *G06F 21/00*     (2013.01)
   *G06F 21/10*     (2013.01)
   *G06Q 10/04*     (2012.01)

(52) U.S. Cl.
   CPC .............. *G06F 21/105* (2013.01); *G06Q 10/04* (2013.01)

(58) Field of Classification Search
   USPC ............ 705/59, 16, 21, 71; 380/44, 262, 278, 380/279
   See application file for complete search history.

(56) References Cited

U.S. PATENT DOCUMENTS

| | | |
|---|---|---|
| 4,937,863 A | 6/1990 | Robert et al. |
| 5,671,412 A | 9/1997 | Christiano |

(Continued)

FOREIGN PATENT DOCUMENTS

WO     2004070574 A2     8/2004

OTHER PUBLICATIONS

Office action dated Jul. 22, 2008, regarding U.S. Appl. No. 11/272,298, 14 pages.

(Continued)

*Primary Examiner* — Dante Ravetti
(74) *Attorney, Agent, or Firm* — Yee & Associates, P.C.; Lisa J. Ulrich

(57) ABSTRACT

System, method and program product for identifying at least one of a multiplicity of software licenses which are not needed by an entity. Each licenses a same type of software to the entity and includes at least one condition of installation or usage of licensed software. The multiplicity of software licenses are evaluated in a first sequence based on a first order of their respective types of conditions, by determining which installations or usages of the software can be considered licensed by an initial one of the software licenses in a first sequence. Afterwards, a determination is made which installations or usages of the software which could not be considered licensed by the initial software license in the sequence can be considered licensed by a next one of the software licenses in the first sequence. Afterwards, a determination is made if all installations or usages of the licensed software by the entity were considered licensed by prior software licenses in the first sequence and if there is at least one subsequent software license in the first sequence. The multiplicity of software licenses are also evaluated in a second sequence based on a second order of their respective types of conditions, by determining which installations or usages of the software can be considered licensed by an initial one of the software licenses in the second sequence. Afterwards, a determination is made which installations or usages of the software which could not be considered licensed by the initial software license in the first sequence can be considered licensed by a next one of the software licenses in the second sequence. Afterwards, a determination is made if all installations or usages of the licensed software by the entity were considered licensed by prior software licenses in the second sequence and if there is at least one subsequent software license in the second sequence.

19 Claims, 9 Drawing Sheets

(56) References Cited

U.S. PATENT DOCUMENTS

| | | | |
|---|---|---|---|
| 5,717,604 A | 2/1998 | Wiggins | |
| 5,745,879 A | 4/1998 | Wyman | |
| 5,790,664 A * | 8/1998 | Coley et al. | 709/203 |
| 6,003,022 A | 12/1999 | Eberhard et al. | |
| 6,356,880 B1 | 3/2002 | Goossens et al. | |
| 6,381,587 B1 | 4/2002 | Guzelsu | |
| 6,389,464 B1 | 5/2002 | Krishnamurthy et al. | |
| 6,510,466 B1 | 1/2003 | Cox et al. | |
| 6,523,173 B1 | 2/2003 | Bergner et al. | |
| 6,526,387 B1 | 2/2003 | Ruffin et al. | |
| 6,546,002 B1 | 4/2003 | Kim | |
| 6,654,788 B1 | 11/2003 | Chance et al. | |
| 6,671,818 B1 * | 12/2003 | Mikurak | 714/4.21 |
| 6,816,882 B1 | 11/2004 | Conner et al. | |
| 6,968,324 B1 | 11/2005 | Ruffin et al. | |
| 7,013,294 B1 | 3/2006 | Sekigawa et al. | |
| 7,062,765 B1 | 6/2006 | Pitzel et al. | |
| 7,133,917 B2 | 11/2006 | Re et al. | |
| 7,168,074 B1 | 1/2007 | Srinivasa et al. | |
| 7,171,546 B2 | 1/2007 | Adams | |
| 7,188,085 B2 * | 3/2007 | Pelletier | 705/50 |
| 7,225,137 B1 | 5/2007 | Barritz | |
| 7,519,561 B2 | 4/2009 | Boomershine et al. | |
| 8,145,596 B2 | 3/2012 | Marsnik et al. | |
| 2001/0013024 A1 * | 8/2001 | Takahashi et al. | 705/59 |
| 2002/0069143 A1 | 6/2002 | Cepeda | |
| 2002/0083003 A1 | 6/2002 | Halliday et al. | |
| 2002/0107809 A1 | 8/2002 | Biddle et al. | |
| 2002/0138441 A1 | 9/2002 | Lopatic | |
| 2002/0161717 A1 | 10/2002 | Kassan et al. | |
| 2002/0178120 A1 | 11/2002 | Reid et al. | |
| 2003/0028440 A1 | 2/2003 | Allen et al. | |
| 2003/0083888 A1 | 5/2003 | Argenton et al. | |
| 2003/0195759 A1 | 10/2003 | Glassco | 705/1 |
| 2004/0003122 A1 | 1/2004 | Melillo | |
| 2004/0010471 A1 | 1/2004 | Lenard et al. | |
| 2004/0088176 A1 | 5/2004 | Rajamani | |
| 2004/0088730 A1 | 5/2004 | Gopalan et al. | |
| 2004/0093594 A1 | 5/2004 | Kapadia et al. | |
| 2004/0249763 A1 | 12/2004 | Vardi | |
| 2004/0254851 A1 | 12/2004 | Himeno et al. | 705/26 |
| 2004/0260589 A1 | 12/2004 | Varadarajan et al. | |
| 2005/0049887 A1 | 3/2005 | Bulleit et al. | |
| 2005/0049973 A1 | 3/2005 | Read et al. | |
| 2005/0060662 A1 | 3/2005 | Soares et al. | |
| 2005/0065863 A1 | 3/2005 | Plumer et al. | |
| 2005/0149447 A1 | 7/2005 | Sherkow | |
| 2006/0106727 A1 | 5/2006 | Yellai et al. | |
| 2006/0287960 A1 | 12/2006 | Marsnik et al. | |
| 2007/0016531 A1 | 1/2007 | Boomershine et al. | |
| 2007/0067260 A1 | 3/2007 | Marsnik et al. | |
| 2007/0106622 A1 | 5/2007 | Boomershine et al. | |

OTHER PUBLICATIONS

Office action dated Dec. 3, 2008, regarding U.S. Appl. No. 11/272,298, 23 pages.

Final office action dated Jun. 12, 2009, regarding U.S. Appl. No. 11/179,405, 20 pages.

Notice of allowance dated Mar. 7, 2014, regarding U.S. Appl. No. 11/179,405, 14 pages.

Notice of allowance dated Jun. 5, 2013, regarding U.S. Appl. No. 11/179,405, 9 pages.

Office action dated Nov. 4, 2008, regarding U.S. Appl. No. 11/179,405, 17 pages.

Final office action dated Sep. 15, 2008, regarding U.S. Appl. No. 11/227,762 13 pages.

Notice of allowance dated Dec. 7, 2011, regarding U.S. Appl. No. 11/227,762, 10 pages.

Office action dated May 21, 2008, regarding U.S. Appl. No. 11/227,762, 14 pages.

Office action dated Nov. 28, 2007, regarding U.S. Appl. No. 11/227,762, 16 pages.

Dixon et al., "Method and Apparatus to Modify CPU Operating Mode Via Test Access Port," Research Disclosure, Article 423103, Jul. 4, 1999, 4 pages.

Goettge et al., "Quest—A Tool for Automated Performance Dependability, and Cost Tradeoff Support," Proceedings of the 1995 International Symposium and Workshop on Systems Engineering of Computer Based Systems, Mar. 1995, pp. 351-357.

Manoel et al., "Introducing IBM Tivoli License Manager," International Business Machines Corporation, ibm.com, Mar. 2003, 48 pages.

Messerschmitt et al., "Marketpalce Issues in Software Planning and Design," IEEE Software, May/Jun. 2004, pp. 62-70.

* cited by examiner

IDENTIFYING UNUTILIZED OR UNDERUTILIZED SOFTWARE LICENSE

BACKGROUND

The present invention relates generally to computer systems, and more specifically to a program tool to identify unutilized or under utilized software licenses.

Typically, software is licensed, not sold. The license includes conditions and restrictions such as a geographic location where the software can be installed, a specific computer CPU serial number in which the software can be installed, a total number of copies which the licensee can install in one or more computers, a type of computer (such as production, development, etc.) on which the software can be used, and the maximum size computer which can execute the software. Often times, a license is not fully utilized. For example, a single license may authorize installation of ten copies of the software program, but the licensee only installs eight copies. Sometimes, there may be two or more licenses that authorize use of the same type of software, and only one such license is needed or the scope of one of the license can be reduced. For example, there may be two licenses for the same type of software, each authorizing installation of five copies, but the licensee only installs a total of eight copies. It has proven difficult for many licensees to effectively manage their licenses when the licensee is a large company with many separate licenses. Often times, the result is that the licensee is paying for more licenses or license scope than actually needed.

An IBM Tivoli License Manager program is a known software license management program. Using this program, when a license is associated with specific installed software, an operator enters into a database information about a license. This information includes maximum size of the computer in which the program can be installed, maximum number of copies of the program that can be installed, expiration date, specific CPU serial number on which to execute the program, and target geographic location for (an unlimited number of copies of) the program. The Tivoli License Manager program checks whether each installed software program complies with an existing license by applying the licenses to the installations based on a predetermined and set order of conditions. For example, the Tivoli License Manager may be preprogrammed to apply all licenses having one type of condition to the installations, and then determine which installations are not covered by this type of license. Then, the Tivoli License Manager may be preprogrammed to apply all licenses having another type of condition, to the remaining installations, and then determine which installations are not covered by either type of license. Then, the Tivoli License Manager may be preprogrammed to apply all licenses having still another type of condition, to the still remaining installations, and then determine which installations are not covered by any of the three license. If any licenses remain after all installations are covered by any of the previously applied licenses, then the Tivoli License Manager deems the remaining licenses as excessive or unnecessary, and they can be terminated to save the customer money. However, the foregoing process does not always identify the most excessive or unnecessary licenses.

Accordingly, an object of the present invention is to better identify excess licenses or licenses with excess scope.

SUMMARY

The invention resides in a system, method and program product for identifying at least one of a multiplicity of software licenses which are not needed by an entity. Each licenses a same type of software to the entity and includes at least one condition of installation or usage of licensed software. The multiplicity of software licenses are evaluated in a first sequence based on a first order of their respective types of conditions, by determining which installations or usages of the software can be considered licensed by an initial one of the software licenses in a first sequence. Afterwards, a determination is made which installations or usages of the software which could not be considered licensed by the initial software license in the sequence can be considered licensed by a next one of the software licenses in the first sequence. Afterwards, a determination is made if all installations or usages of the licensed software by the entity were considered licensed by prior software licenses in the first sequence and if there is at least one subsequent software license in the first sequence. The multiplicity of software licenses are also evaluated in a second sequence based on a second order of their respective types of conditions, by determining which installations or usages of the software can be considered licensed by an initial one of the software licenses in the second sequence. Afterwards, a determination is made which installations or usages of the software which could not be considered licensed by the initial software license in the first sequence can be considered licensed by a next one of the software licenses in the second sequence. Afterwards, a determination is made if all installations or usages of the licensed software by the entity were considered licensed by prior software licenses in the second sequence and if there is at least one subsequent software license in the second sequence.

In accordance with a feature of the present invention, one of the prior software licenses in the first sequence licenses a fixed number greater than one of copies of the licensed software. If all installations or usages of the licensed software by the entity were considered licensed by prior software licenses in the first sequence, a determination is made if the fixed number of installations or usages were considered licensed by the one prior software license. If less than the fixed number of installations or usages were considered licensed by the one prior software license, a determination is made how much less than the fixed number of installations or usages were considered licensed by the one prior software license and an operator is notified that the one prior software license is not fully utilized.

DETAILED DESCRIPTION OF THE PREFERRED EMBODIMENTS

Figure 1:
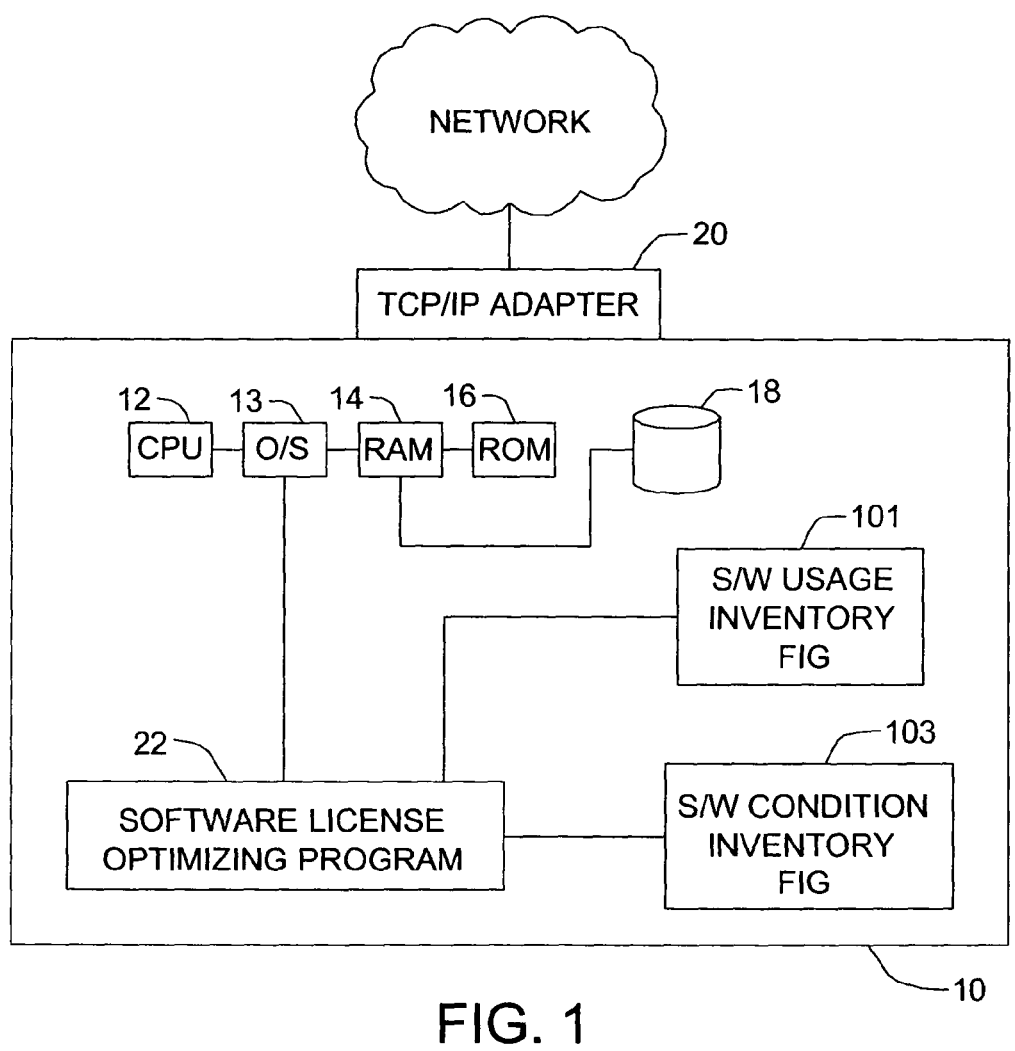
FIG. 1 is a block diagram of a computer system in which the present invention is incorporated.

The present invention will now be described in detail with reference to the figures. The present invention is implemented with a programmed computer such as computer 10 illustrated in FIG. 1. Computer 10 includes a known CPU 12, operating system 13, RAM 14, ROM 16, disk storage 18, and TCP/IP card 20. Computer 10 also includes a software license optimizing program 22 according to the present invention. Program 22 compares license conditions and scope of a plurality of software licenses for the same type of software to the actual utilization of the software to determine if all of the software licenses are needed. Often times, the software licenses collectively allow more software utilization than is actually needed, and the excess license(s) are costly. Program 22 also determines if an individual software license can be reduced in scope, i.e. reduce the number of copies licensed, to reduce the license fees for the software license.

Figure 2A:
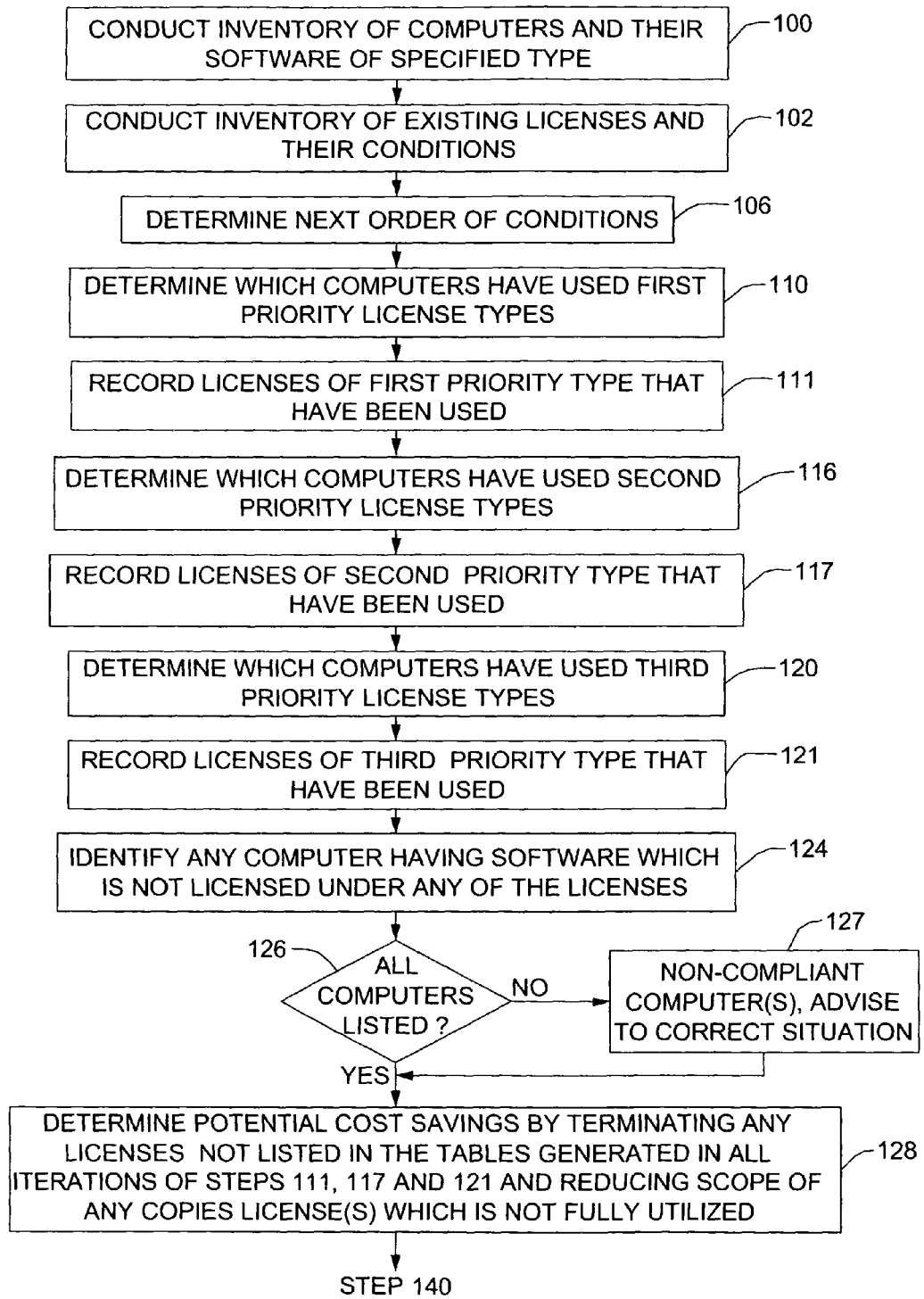
FIGS. 2(A) and 2(B) form a flow chart of a software license optimizing program 22 within the computer system of FIG. 1 according to the present invention.
Figure 2B:
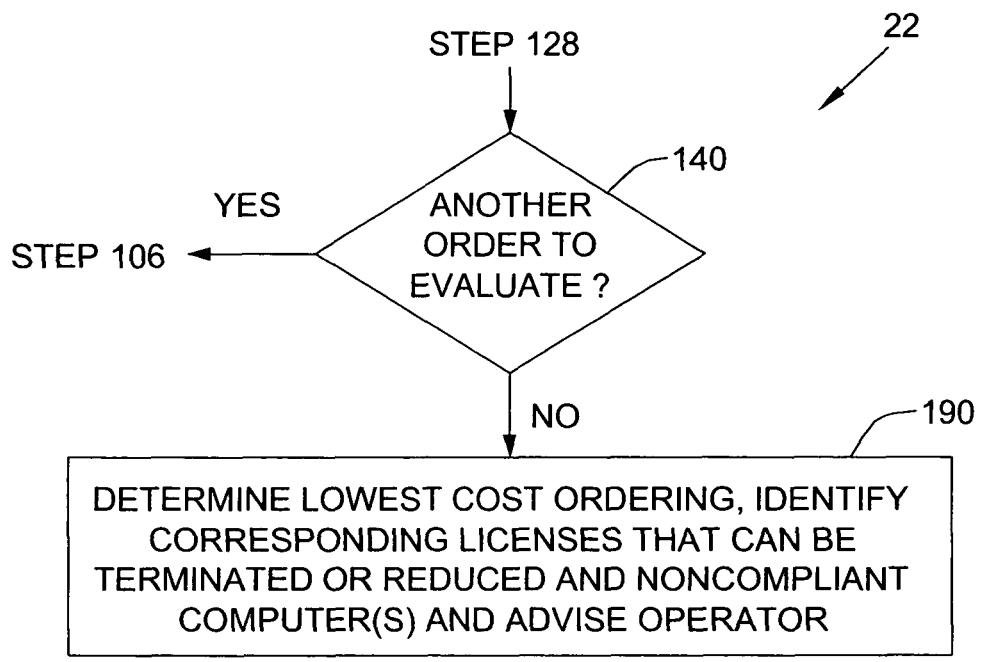

FIGS. 2(A) and 2(B) illustrate the functional steps and operation of program 22 in more detail. FIGS. 3-8 illustrate six iterations of program 22 as an example of processing software licenses with three different license conditions or restrictions, where each iteration represents a different order of applying the three different licensing conditions or restrictions. However, program 22 can be used with different types of licensing conditions, and different numbers of licensing conditions.

In step 100 of FIG. 2(A), program 22 conducts an inventory of each type of software which is currently being used by one company, for example, the user's company or the user's customer. The inventory identifies each computer (and its serial number) on which the type of software is installed, the geographic location of the computer, and the number of installed copies of the type of software. If there are other conditions or restrictions on usage specified in the associated software licenses (such as listed below), the inventory can identify other, corresponding characteristics of the usage. Program 22 conducts this inventory by querying configuration files and other files for the computers containing this information. Program 22 records the results of the software usage inventory in a table or file 101 (shown in FIGS. 1 and 3-8). In step 102 of FIG. 2(A), (before, after or concurrent with step 100) the user conducts an inventory of the software licenses for this type of software used by the one company. The inventory identifies the type(s) of usage condition(s) or restriction(s) in each software license. After conducting the inventory, the user populates a table or file 103 (shown in FIGS. 1 and 3-8) with fields and predetermined key words for the different types of conditions or restrictions. By way of example, a condition or restriction may state the following:

(a) The type of software can only be used on a specified computer (typically specified by the computer CPU serial number), with no restriction on the number of copies that can be installed on the specified computer or the geographic location of the specified computer. In file 103, this type of license is referenced by the key word, "CPU Serial #".

(b) The type of software can only be used at a specified geographic location of the computer CPU, with no restriction on the number of computers at that geographic location on which the type of software can be installed or the number of copies of the software that can be installed at that geographic location. In file 103, this type of license is referenced by the key word, "Location City XYZ".

(c) The total number of copies of the type of software that can be used, with no restriction on the number of computer CPUs on which the software can be installed or the geographic location of the computer CPUs on which the software can be installed. In file 103, this type of license is referenced by the key word, "Number of Copies #".

(d) The maximum processing power of a computer CPU on which the type of software can be used, with no restriction on the number of copies that can be installed on the computer or the geographic location of the computer. (This type of license is not used in the example of FIGS. 3-8 or illustrated in file 103.)

(e) The business unit which uses software. (This type of license is not used in the example of FIGS. 3-8 or illustrated in file 103.)

(f) The number of Logical Partitions ("LPARS") in which the software can be used. (This type of license is not used in the example of FIGS. 3-8 or illustrated in file 103.)

(g) The number of actual users of the software program. (This type of license is not used in the example of FIGS. 3-8 or illustrated in file 103.)

(h) The number of computers or server "nodes" on which the software can be installed. (This type of license is not used in the example of FIGS. 3-8 or illustrated in file 103.)

(i) A type of computer (such as production, development, etc.) on which the software can be installed. (This type of license is not used in the example of FIGS. 3-8 or illustrated in file 103.)

After performing the inventory of the software licenses, program 22 records the results of the software usage inventory in file 103.

In the example illustrated in FIGS. 3-8, there are five software licenses applicable to the same type of software for the one company. In this example, each of the software licenses has only one of the following restrictions: (i) computer CPU serial number in which the software can be installed (unlimited number of copies on the computer, unrestricted geographic location of the computer CPU), (ii) geographic location of the computer CPU in which the software can be installed (unlimited number of computers at the geographic location in which the software can be installed, unlimited number of copies that can be installed on the computer(s) at the geographic location), or (iii) total number of copies of the software that can be installed (unlimited number of computer CPUs up to the total number of copies, unrestricted geographic location of the computer CPUs). In the example of FIGS. 3-8, license #1 has only the condition of computer CPU serial number, license #2 has only the condition of geographic location of the computer CPU, license #3 has only the condition of total number of copies of the software, license #4 has only the condition of geographic location of the computer CPU, and license #5 has only the condition of the computer CPU serial number. It should be noted that the foregoing example is just one possible example. Program 22 can evaluate other types of software licenses with other types of individual conditions or combinations of conditions (in a single license).

As described below, program 22 compares the software licenses to the software inventory in different orders of the software license conditions; one or more of the orders will reveal the most excesses, if any, in the software licenses. If there are such excesses, this represents an opportunity to terminate or reduce the scope of the excess software license(s), and thereby, reduce the license fees. Each of the FIGS. 3-8 represents an iteration of program 22 with a different order in which the conditions of the software licenses are evaluated. In one embodiment of the present invention, program 22 conducts an iteration for every possible order of conditions. By conducting every possible order of iteration, program 22 is able to identify the optimum order of conditions. The optimum order of conditions is the order in which license consumption is minimized. In another embodiment of the present invention, program 22 conducts an iteration for two or more predetermined orders of conditions. In this other embodiment of the present invention, the programmer of program 22 previously determined that certain orders are most likely in general to identify excess licenses or excess license scopes than other orders. So, in this other embodiment of the present invention, the programmer preprogrammed program 22 to evaluate only these predetermined orders. Typically, the following orders of conditions are most likely to identify excess licenses or excess license scopes for types of licenses currently used: an unrestricted license except that all copies of the software program be used by or for the company, a geographic location license, and a limitation on the total number of licensed copies where the total number is more than one. However, these orders are dependent on the nature of the licenses.

Figure 3:
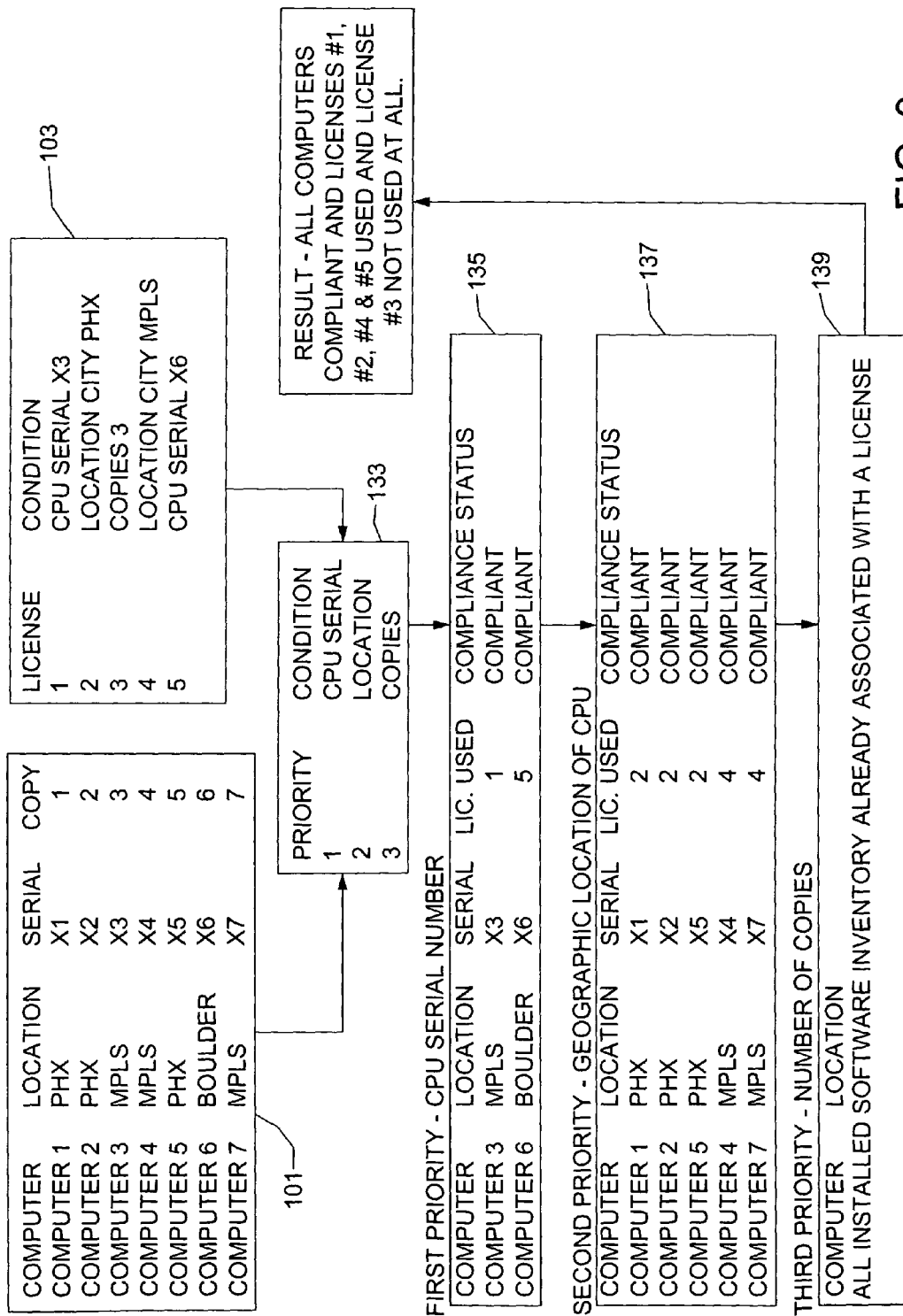
FIG. 3 illustrates tables and other data generated during a first iteration of the flow chart of FIGS. 2(A) and 2(B) representing a first order of conditions of software licenses.

First Order of Conditions and First Iteration of Program 22—FIG. 3

In step 106, program 22 determines a next order (i.e. the first order in the first iteration) in which to evaluate the restrictions or conditions of the software licenses. Program 22 determines the first order either randomly (without repetition) if all orders are to be evaluated or according to a preprogrammed order if only some orders are to be evaluated. In the first order and iteration of FIG. 3, program 22 evaluates the conditions in order of (1) computer CPU serial number, (2) geographic location of the computer CPU, and (3) total number of installed copies of the software program ABC. Program 22 generates a condition ordering table 133 to record this first order of conditions.

In step 110, program 22 identifies from file 103 that license #1 has a "first priority" condition or restriction on the computer CPU serial number on which the software program ABC can be installed. In the illustrated example, there are two such licenses. According to license #1, the software program ABC can be installed only on the computer CPU with serial number X3. Also in step 110, program 22 identifies from file 101 that computer CPU serial number X3 has software program ABC installed. So, program 22 makes an entry in a "First Priority—CPU Serial" table 135 that this utilization of the software program on computer CPU serial number X3 is compliant with license #1 and that license #1 has been used (step 111). Also in the illustrated example, according to license #5, the software program ABC can be executed on the computer CPU with serial number X6. Also in step 110, program 22 identifies from file 101 that computer CPU serial number X6 is has software program ABC installed. So, program 22 makes a corresponding entry in table 135 that this utilization of the software program is compliant with license #5 and that license #5 has been used (step 111). Because there are uses of software licenses #1 and #5, these licenses are not excess based on the first order of conditions and iteration of program 22 but may be excess based on a subsequent order of conditions and iteration of program 22.

Next, program 22 considers the "second priority" condition of the first iteration, i.e. the geographic location of the computer CPU. There are two such licenses in the example. So in step 116, program 22 identifies from file 103 that license #2 has a condition or restriction on the geographic location in which the software program can be executed. In the illustrated example, according to license #2, the software program ABC can only be executed in Phoenix (in an unlimited number of computers). Also in step 120, program 22 identifies from file 101 all of the computer CPUs that are located in Phoenix, and not considered as licensed under a previous license in this iteration/order. In the illustrated example, computer CPU serial numbers X1, X2 and X5 are all located in Phoenix, and none was considered licensed under license #1 or #5, so program 22 makes entries in a "Second Priority—Geographic Location" table 137 that utilization of the software program on computer CPU serial numbers X1, X2 and X5 is compliant with license #2 and that license #2 has been used (step 117). Also in step 116, program 22 identifies from file 103 that license #4 has a condition or restriction on the geographic location in which the software program can be executed. In the illustrated example, according to license #4, the software program can be executed in Minneapolis (in an unlimited number of computers). Also in step 116, program 22 identifies from file 101 all of the computer CPUs that are located in Minneapolis, and not licensed under a previous license in this iteration/order. In the illustrated example, computer CPU serial numbers X3, X4 and X7 are all located in Minneapolis. However, computer CPU serial X3 was previously considered licensed under license #1. So, program 22 makes entries in table 137 that utilization of the software program on computer CPU serial numbers X4 and X7 (but not computer CPU serial number X3) is compliant with license #4 and that license #4 has been used (step 117).

Next, program 22 considers the "third priority" condition in the first order and iteration of FIG. 3, i.e. total number of copies of the software program that are permitted by each "Number-of-Copies" license (regardless of location or number of computers). In the illustrated example, there is one such "Number-of-Copies" license. So, in step 120, program 22 identifies from file 103 that license #3 has a condition or restriction on the total number of copies that can be made of the software program ABC. In the illustrated example, according to license #3, the total number of copies of software program ABC that can be made is three. Also in step 120, program 22 identifies from file 101 all computers, if any, that have the software program installed, and were not considered licensed under a previous license considered in this first order/iteration. In the illustrated example, all computer CPUs in file 101 were considered licensed under another, previous license during the first order/iteration. Consequently, in this order and iteration of program 22, license #3 is not utilized or needed at all. So, program 22 does not make any entry in a "Third Priority—Number-of-Copies" table 139 (step 121).

Next, program 22 checks if all the computers listed in table 101 are listed in the tables 135, 137 and 139 (step 124). If not (decision 126, no branch), then such computers are noncompliant, i.e. their software is not licensed. In such a case, program 22 notifies the user that either the software should be deleted or a new license should be obtained for the software on such noncompliant computer(s) (step 127). If all the computers are compliant (decision 126, yes branch), which is the case in the illustrated example or after step 127, program 22 calculates the license fees that can be saved by terminating each license that is deemed completely excessive, i.e. not used at all, based on the first ordering of conditions (step 128).

Program 22 makes this calculation by comparing the licenses listed in file 103 to those listed in tables 135, 137 and 139. If any of the licenses listed in file 103 are not listed in any of the tables 135, 137 or 139, then such licenses are deemed completely excessive based on the first ordering of conditions. Then, program 22 consults a file 200 (FIG. 1) which lists the cost of each license to determine the savings by terminating the license. In the illustrated example, licenses #3 is not needed and represents a potential savings in license fees. Also, program 22 estimates the license fee saved by each Number-of-Copies license, if any, that can be reduced in scope, i.e. reduced in total number of copies licensed, based on the first ordering of conditions (step 128). There are no such licenses in this ordering of the illustrated example. Then, program 22 totals the potential license fee savings by terminating licenses which are completely excess (and reducing the scope of partially excess licenses, if any) based on the first order of conditions (step 128).

Figure 4:
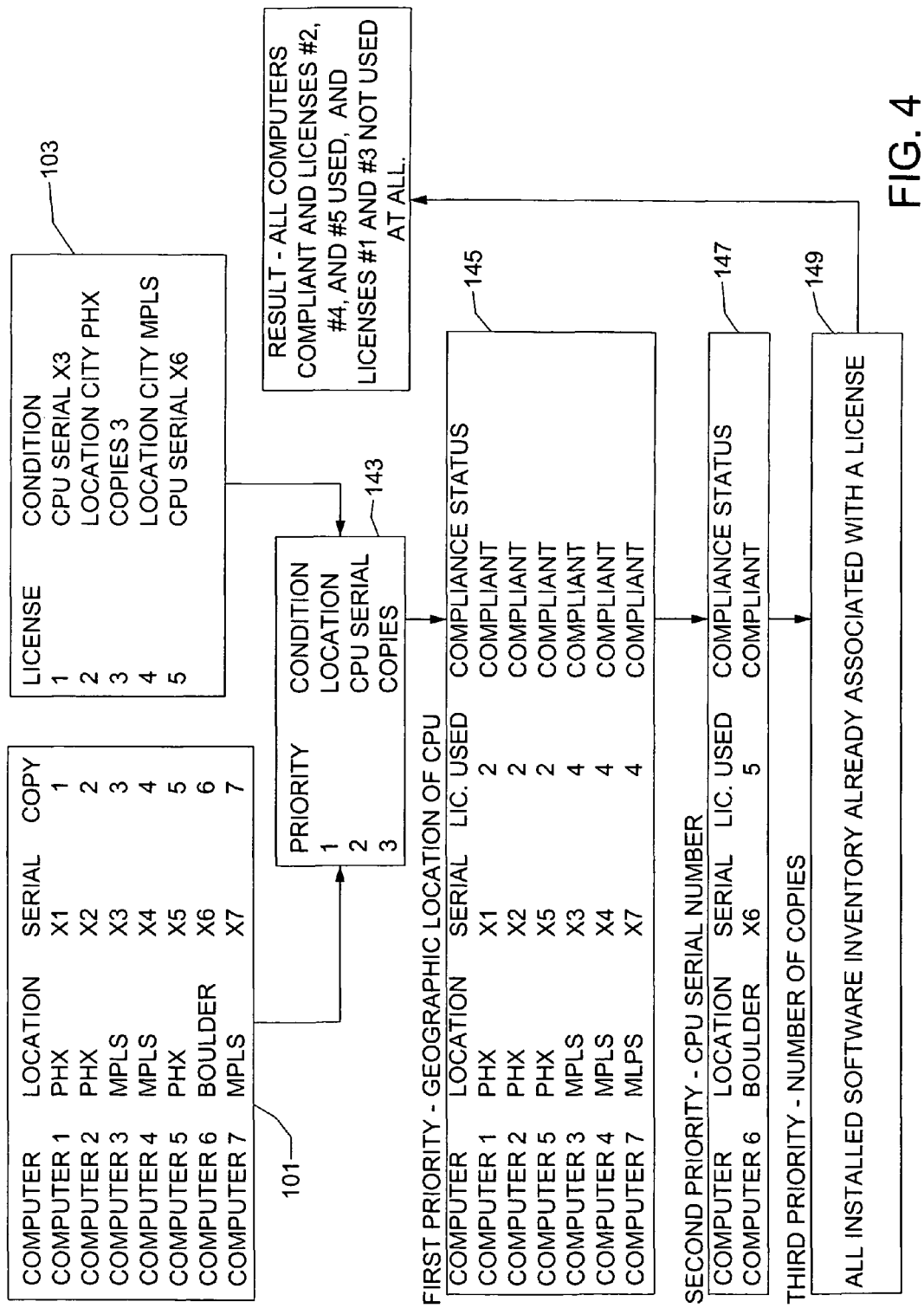
FIG. 4 illustrates tables and other data generated during a second iteration of the flow chart of FIGS. 2(A) and 2(B) representing a second order of conditions of software licenses.

Second Order of Conditions and Second Iteration of Program 22—FIG. 4

Next, program 22 determines that there are other orders in which to test the conditions (decision 140, yes branch). Consequently, program 22 identifies the next order (step 106), for example, (1) geographic location of the computer CPU, (2) computer CPU serial number, and (3) total number of copies that can be installed. Program 22 records this order in a table 143 of FIG. 4. Then, program 22 repeats the foregoing steps 110-128 with this new order of conditions.

In the second iteration of step 110, program 22 determines from file 103 that licenses #2 and #4 permit an unlimited number of computers to have the software and an unlimited number of copies of the software in Phoenix and Minneapolis. Program 22 also determines from file 101 that computer serial numbers X1, X2 and X5 are located in Phoenix, and computer serial numbers X3, X4 and X7 are located in Minneapolis. So, program 22 enters all six of these computers into a "First Priority—Geographic Location" table 145 as being compliant with license #2 or #4 and indicating that licenses #2 and #4 have been used (step 111). (Compared to the order of FIG. 3 where licenses #2 and #4 were used for licensing fewer computers, the order of FIG. 4 provides greater utilization of licenses #2 and #4.) Next, in the second iteration of step 116, program 22 determines from file 103 that license #1 is for computer serial number X3. However, program 22 determines from table 145 that computer serial number X3 was already considered licensed under license #4. Consequently, program 22 does not enter license #1 in a "Second Priority—computer CPU Serial number" table 147 and will deem license #1 as excessive during this order of conditions, because it is not needed to license computer serial number X3. Also in the second iteration of step 116, program 22 determines from file 103 that license #5 is for computer CPU serial number X6. Program 22 also determines from table 141 that computer CPU serial number X6 was not licensed under a previous license considered in this order of conditions, so program 22 enters license #5 and computer serial number X6 in table 147 (step 117). Next, program 22 performs the second iteration of step 120. In this iteration of step 120, program 22 determines from file 103 that license #3 allows three copies (on any number of computers in any geographic location). Program 22 also determines from file 101 and tables 145 and 147 that all of the computers listed in file 101 have already been considered licensed under another license previously considered during this order of conditions. Consequently, program 22 does not enter license #3 in a "Third priority—Number of Copies" table 149, and will deem license #3 as completely excessive based on this order of conditions. In total, based on the order of conditions of FIG. 4, licenses #1 and #3 are not needed at all, and can be terminated.

Next, program 22 checks if all the computers listed in table 101 are listed in the tables 145, 147 and 149 (step 124). If not (decision 126, no branch), then such computers are noncompliant, i.e. their software is not licensed. In such a case, program 22 notifies the user that either the software should be deleted or a new license should be obtained for the software on such noncompliant computer(s) (step 127). If all the computers are compliant, which is the case in the illustrated example (decision 126, yes branch) or after step 127, program 22 calculates the license fees that can be saved by terminating each license that is deemed completely excessive, i.e. not used at all, based on the first order of conditions (step 128). Program 22 makes this calculation by comparing the licenses listed in file 103 to those listed in tables 145, 147 and 149. If any of the licenses listed in file 103 are not listed in any of the tables 145, 147 or 149, then such licenses are deemed completely excessive based on the first ordering. Then, program 22 consults file 200 (FIG. 1) which lists the cost of each license to determine the savings by terminating the license. In the illustrated example, licenses #1 and #3 are not needed at all, and therefore represent a potential savings in license fees. Also, program 22 estimates the license fee saved by each Number-of-Copies license, if any, that can be reduced in scope, i.e. reduced in total number of copies licensed, based on the first ordering (step 128). There are no such licenses in the illustrated example because the sole Number-of-Copies license is not needed at all and the cost of its termination was already considered. Then, program 22 totals the potential license fee savings by terminating licenses which are completely excess based on the first order of conditions (step 128).

Figure 5:
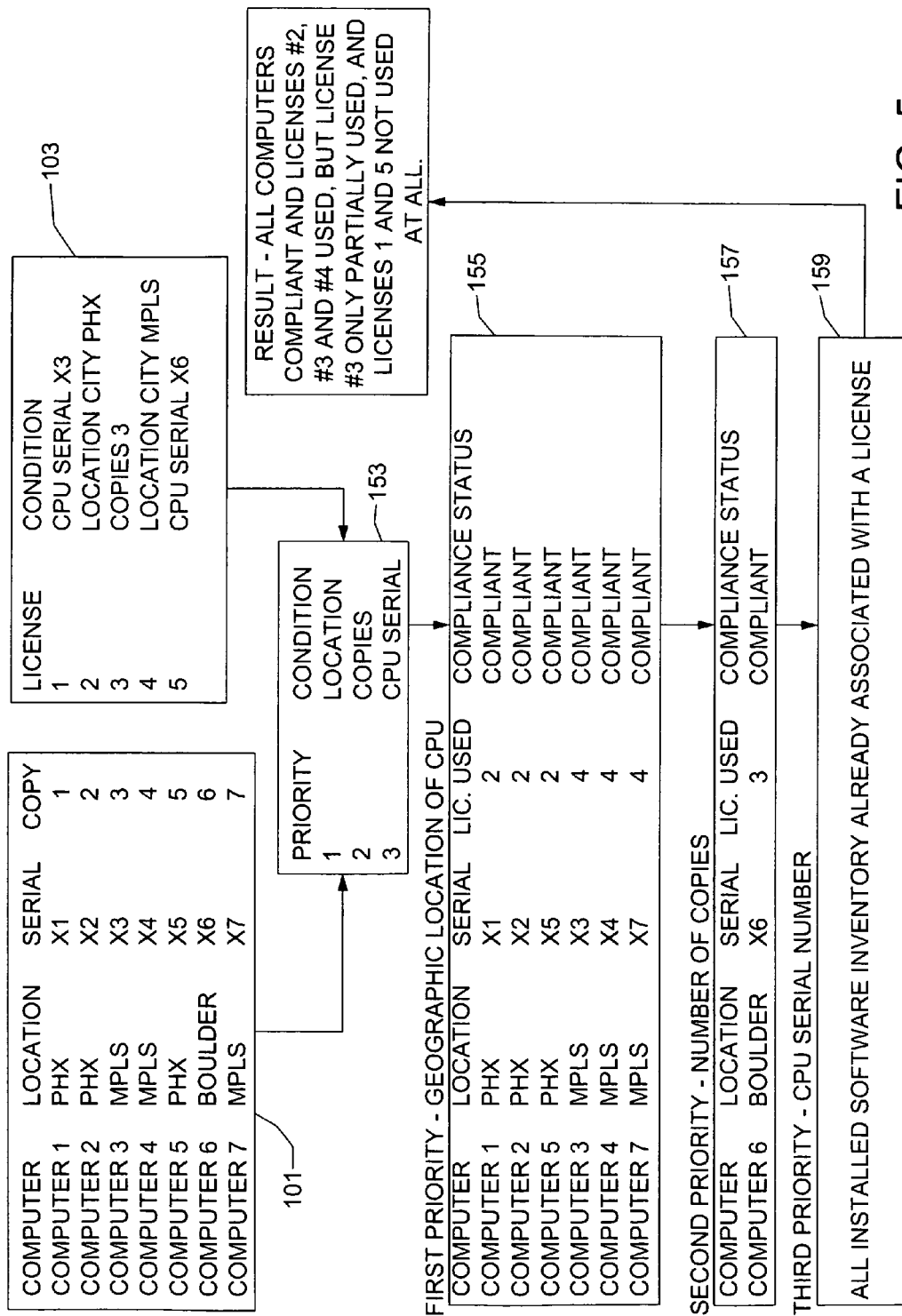
FIG. 5 illustrates tables and other data generated during a third iteration of the flow chart of FIGS. 2(A) and 2(B) representing a third order of conditions of software licenses.

Third Order of Conditions and Third Iteration of Program 22—FIG. 5

Next, program 22 determines that there is another order in which to test the conditions (decision 140, yes branch). Consequently, program 22 identifies the next order of conditions (step 106), in this example, (1) computer CPU location, (2) total number of copies that can be used, and (3) computer CPU serial number. Program 22 records this order in a table 153 of FIG. 5. Then, program 22 repeats the foregoing steps 110-128 with this new order of conditions.

In the third iteration of step 110, program 22 determines from file 103 that licenses #2 and #4 permit an unlimited number of computers to have the software program ABC in Phoenix and Minneapolis, respectively, and an unlimited number of copies of software program ABC in Phoenix and Minneapolis, respectively. Also in step 110, program 22 determines from file 101 that computers X1, X2 and X5 are located in Phoenix, and computers X3, X4 and X7 are located in Minneapolis. So, program 22 enters all six of these computers into a "First Priority—Geographic Location" table 155 as being compliant with licenses #2 and #4 and also that licenses #2 and #4 have been used (step 111).

Next, program 22 performs the third iteration of step 116. In this iteration of step 116, program 22 determines from file 103 that license #3 allows three copies of software program ABC (on any number of computers in any geographic location). Program 22 also determines from table 155 that all of the computers except computer X6 have already been considered licensed under another license. Program 22 then determines from file 101 that one copy of the software program ABC is executing on computer serial number X6. This partially utilizes or partially consumes license #3. So, program 22 makes an entry in a "Second Priority—Number-of-Copies" table 157 that computer serial number X6 is compliant with license #3 and that license #3 has been used (although not fully consumed) (step 117). License #3 permitted three copies, and only one copy was used under license #3. This represents an opportunity to reduce the scope and license fee of license #3.

Next, in the third iteration of step 120, program 22 determines from file 103 that license #1 is for computer CPU serial number X3. However, program 22 determines from table 155 that computer CPU serial number X3 was already considered licensed under license #4. Consequently, program 22 does not enter license #1 in a "Third Priority—CPU Serial Number" table 159 and will deem license #1 as excessive based on this order of conditions, because it is not needed to license computer CPU serial number X3. Also in the third iteration of step 120, program 22 determines from file 103 that license #5 is for computer CPU serial number X6. Program 22 also determines from table 157 that computer CPU serial number X6 was already considered licensed under license #3. Consequently, program 22 does not enter license #5 in table 159 and will deem license #5 as excessive based on this order of conditions, because it is not needed to license computer CPU serial number X6.

Next, program 22 checks if all the computers listed in table 101 are listed in the tables 155, 157 and 159 (step 124). If not (decision 126, no branch), then such computers are noncompliant, i.e. their software is not licensed. In such a case, program 22 notifies the user that either the software should be deleted or a new license should be obtained for the software on such noncompliant computer(s) (step 127). If all the computers are compliant, which is the case in the illustrated example (decision 126, yes branch) or after step 127, program 22 calculates the license fees that can be saved by terminating each license that is deemed completely excessive, i.e. not used at all, based on the first ordering (step 128). Program 22 makes this calculation by comparing the licenses listed in file 103 to those listed in tables 155, 157 and 159. If any of the licenses listed in file 103 are not listed in any of the tables 155, 157 or 159, then such licenses are deemed completely excessive based on the first ordering. Then, program 22 consults file 200 (FIG. 1) which lists the cost of each license to determine the savings by terminating the license. In the illustrated example, licenses #1 and #5 are not needed at all and represent a potential savings in license fees. Also, program 22 estimates the license fee saved by each copy license, if any, that can be reduced in scope, i.e. reduced in total number of copies licensed, based on the first ordering (step 128). To make this estimation, program 22 checks the "Number-of-Copies" table 139 to identify the total number of copies of software program ABC that are actually installed in all of the computers which are licensed under a Number-of-Copies license. In the illustrated example there is a single computer with serial number X6 that has a single copy of software program ABC which is licensed under Number-of-Copies license #3. Program 22 then subtracts the total number of installed copies licensed under license #3 from the total number of installed copies permitted under license #3 to determine the excess of license #3. In this example, the excess is two copies. Program 22 then estimates the potential savings by reducing the scope of license #3 by two copies. This estimate can be based on a predetermined pro rata formula such as (a) total license times the number of unused copies divided by the total number of permitted copies, or (b) total contract prorated to license by computer size. Then, program 22 totals the potential license fee savings by terminating licenses #1 and #5 and reducing the scope of partially excess license #3, based on the third order of conditions (step 128).

Figure 6:
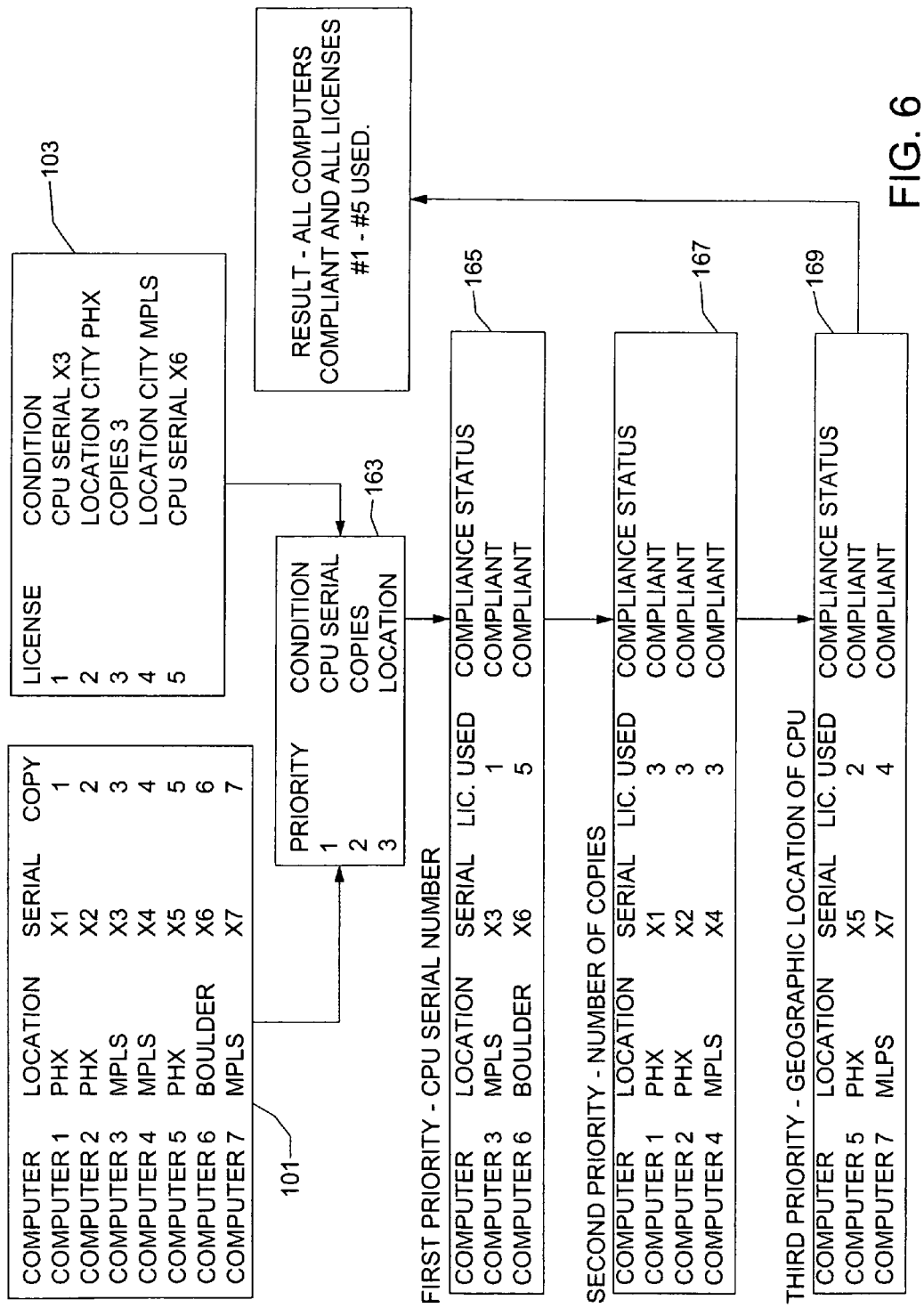
FIG. 6 illustrates tables and other data generated during a fourth iteration of the flow chart of FIGS. 2(A) and 2(B) representing a fourth order of conditions of software licenses.

Fourth Order of Conditions and Fourth Iteration of Program 22—FIG. 6

Next, program 22 determines that there are other orders in which to test the conditions (decision 140, yes branch). Consequently, program 22 identifies the next order (step 106), in this example, (1) computer CPU serial number, (2) total number of copies, and (3) computer CPU location. Program 22 records this order in a table 163 of FIG. 6. Then, program 22 repeats the foregoing steps 110-128 (a fourth time) with this new order of conditions.

In the fourth iteration of step 110, program 22 identifies from file 103 that license #1 has a condition or restriction on the computer CPU serial number on which the software program can be installed. In the illustrated example, according to license #1, the software program ABC can only be executed on the computer CPU with serial number X3. Also in step 110, program 22 identifies from file 101 that computer CPU serial number X3 has this software program installed. So, program 22 makes a corresponding entry in a "First Priority—Computer CPU Serial Number" table 165 that this utilization of the software program is compliant with license #1 and that license #1 has been used. In the illustrated example, according to license #5, the software program ABC can be executed on the computer CPU with serial number X6. Also in step 110, program 22 identifies from file 101 that computer CPU serial number X6 has this software program installed. So, program 22 makes a corresponding entry in table 165 that this utilization of the software program is compliant with license #5 and that license #5 has been used. Because there are software program usages which correspond to each of the software licenses #1 and #5, program 22 will not consider these licenses as excess during this iteration of program 22.

Next, program 22 considers the second condition of the fourth iteration i.e. the total number of copies of the software program that are permitted by each Number-of-Copies license. So, in step 116, program 22 identifies from file 103 that license #3 has a condition or restriction on the total number of copies that can be made of the software program ABC. In the illustrated example, according to license #3, the total number of copies is three. Also in step 116, program 22 identifies from file 101 one or more of the computers that have the software program installed, and were not considered as licensed under a license considered previously. In this illustrated example, computer CPU serial numbers X1, X2 and X4 have the software program installed, were not previously considered as licensed under another license, and each has one copy installed. This fully utilizes or consumes license #3. So, program 22 makes entries for table 167 to indicate that computers X1, X2 and X4 are considered licensed under license #3 (step 117). Program 22 did not make an entry in table 167 for computer CPU serial number X3 because computer CPU serial number X3 was already licensed under license #1. Also, program 22 did not make an entry in table 167 for computer CPU serial numbers X5 or X7 because the total number of copies licensed under license #3 was already exhausted by computers X2, X2 and X4.

Next, program 22 considers the third condition of the fourth iteration, the geographic location of the software program ABC (step 120). Thus, program 22 determines from file 103 that licenses #2 and #4 permit an unlimited number of computers to have the software program in Phoenix and Minneapolis, respectively, and an unlimited number of copies of the software program in Phoenix and Minneapolis, respectively. Program 22 also determines from file 101 that computer CPU serial numbers X1, X2 and X5 are located in Phoenix, and computer CPU serial numbers X3, X4 and X7 are located in Minneapolis. However, computer CPU serial numbers X1, X2, X3, X4 and X6 were considered licensed under licenses #1, #3 and #5 considered previously during this order of conditions. So, program 22 enters only computer CPU serial number X5 and X7 in a "Third Priority—Geographic Location" table 169 as being compliant with licenses #2 and #4 and that licenses #2 and #4 have been used (step 121). Compared to the orders of conditions of FIGS. 3, 4 and 5, the order of conditions of FIG. 4 provides lesser utilization of licenses #2 and #4. The result is that all licenses are used and the Number-of-Copies license is completely exhausted in the order of conditions of FIG. 4. Consequently, there is no potential to reduce license fees by terminating licenses or reducing the scope of any licenses.

Next, program 22 checks if all the computers listed in table 101 are listed in the tables 165, 167 and 169 (step 124). If not (decision 126, no branch), then such computers are noncompliant, i.e. their software is not licensed. In such a case, program 22 notifies the user that either the software should be deleted or a new license should be obtained for the software on such noncompliant computer(s) (step 127). If all the computers are compliant, which is the case in the illustrated example (decision 126, yes branch) or after step 127, program 22 calculates the license fees that can be saved by terminating each license that is deemed completely excessive, i.e. not used at all, based on the first ordering (step 128). Program 22 makes this calculation by comparing the licenses listed in file 103 to those listed in tables 165, 167 and 169. If any of the licenses listed in file 103 are not listed in any of the tables 165, 167 or 169, then such licenses are deemed completely excessive based on the first ordering. There are no such excess licenses in this order/iteration of FIG. 6. Also, program 22 estimates the license fee saved by each Copy license, if any, that can be reduced in scope, i.e. reduced in total number of copies licensed, based on this order/iteration (step 128). There are no such Number-of-Copies licenses in this order/iteration. Then, program 22 totals the potential license fee savings by terminating licenses, if any, which are completely excess and reducing the scope or partially excess licenses, if any based on the first order of conditions (step 128). There are no such savings based on this order of conditions.

Figure 7:
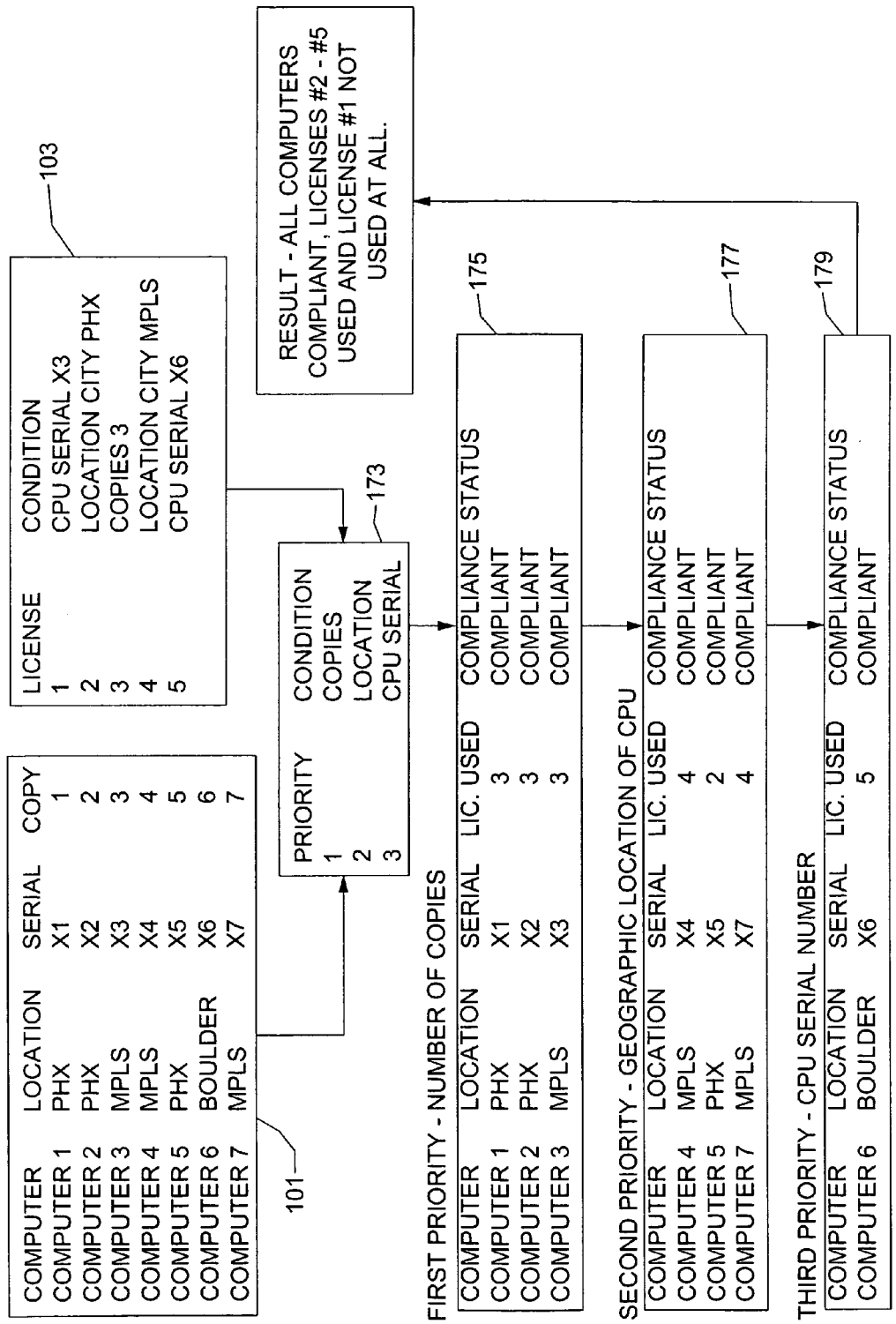
FIG. 7 illustrates tables and other data generated during a fifth iteration of the flow chart of FIGS. 2(A) and 2(B) representing a fifth order of conditions of software licenses.

Fifth Order of Conditions and Fifth Iteration of Program 22—FIG. 7

Next, program 22 determines that there are other orders in which to test the conditions (decision 140, yes branch). Consequently, program 22 identifies the next order (step 106), in this example, (1) total number of copies under Number-of-Copies license(s), (2) computer CPU location, and (3) computer CPU serial number. Program 22 records this order in a table 173 of FIG. 7. Then, program 22 repeats the foregoing steps 110-128 (a fifth time) with this new order of conditions.

In the fifth iteration of step 110, program 22 identifies from file 103 that license #3 has a condition or restriction on the total number of copies that can be made of the software program ABC. In the illustrated example, according to license #3, the total number of copies that can be made is three. Also in step 110, program 22 identifies from file 101 one or more of the computers that have the software program installed and have a total of three copies installed, because the limit in license #3 is three copies. In the illustrated example, computer CPU serial numbers X1, X2 and X3 have the software program ABC installed, and each has one copy installed. This fully utilizes or consumes license #3. So, program 22 makes entries in table 175 to indicate that computer serial numbers X1, X2 and X3 are compliant with license #3 and that license #3 has been used (step 111). (If instead, computer serial number X1 had two copies installed and computer serial number X2 had one copy installed, then program 22 would only list computer serial numbers X1 and X2 in table 175, because these two computers would consume license #3.)

Next, program 22 considers the second condition of the fifth iteration, the geographic location of the software program ABC (step 120). Thus, program 22 determines from file 103 that licenses #2 and #4 permit an unlimited number of computers to have the software program in Phoenix and Minneapolis, respectively, and an unlimited number of copies of the software program in Phoenix and Minneapolis, respectively. Program 22 also determines from file 101 that computer CPU serial numbers X1, X2 and X5 are located in Phoenix, and computer CPU serial numbers X3, X4 and X7 are located in Minneapolis. However, computer serial numbers X1, X2 and X3 were previously considered licensed under license #3. So, program 22 enters computer CPU serial number X4, X5 and X7 into a "Second Priority—Geographic Location" table 179 as being licensed under licenses #2 and #4, and also enters the fact that licenses #2 and #4 have been used (step 121). (Compared to the orders of FIGS. 3, 4 and 5, the order of FIG. 7 provides much lesser utilization of licenses #2 and #4.)

In the fifth iteration of step 116, program 22 considers the third condition, and determines from file 103 that license #1 is for computer CPU serial number X3. However, program 22 determines from table 175 that computer CPU serial number X3 was already considered licensed under license #3 in this order of conditions. Consequently, program 22 does not enter license #1 in a "Second Priority—Computer CPU Serial Number" table 177 and will deem license #1 as excessive because it is not needed to license computer CPU serial number X3. Also in the fifth iteration of step 116, program 22 determines from file 103 that license #5 is for computer CPU serial number X6. Program 22 also determines that computer serial number X6 was not considered licensed under a previous license in this order of conditions. Consequently, program 22 enters license #5 in table 177 (step 117). Next, program 22 checks if all the computers listed in table 101 are listed in the tables 175, 177 and 179 (step 124). If not (decision 126, no branch), then such computers are noncompliant, i.e. their software is not licensed. In such a case, program 22 notifies the user that either the software should be deleted or a new license should be obtained for the software on such noncompliant computer(s) (step 127). If all the computers are compliant, which is the case in the illustrated example (decision 126, yes branch) or after step 127, program 22 calculates the license fees that can be saved by terminating each license that is deemed completely excessive, i.e. not used at all, based on the first ordering of conditions (step 128). Program 22 makes this calculation by comparing the licenses listed in file 103 to those listed in tables 175, 177 and 179. If any of the licenses listed in file 103 are not listed in any of the tables 175, 177 or 179, then such licenses are deemed completely excessive based on the first ordering of conditions. License #1 is not listed in any of the tables 175, 177 or 179, and therefore, license #1 is completely excessive in this ordering of conditions, and its license fee can be avoided by termination of license #1. Also, program 22 estimates the license fee saved by each Number-of-Copies license, if any, that can be reduced in scope, i.e. reduced in total number of copies licensed, based on the first ordering (step 128). There are no such Number-of-Copies licenses in the illustrated example that can be reduced in scope because license #3 has been fully consumed. Then, program 22 totals the potential license fee savings by terminating license #1 based on the fifth order of conditions (step 128).

Figure 8:
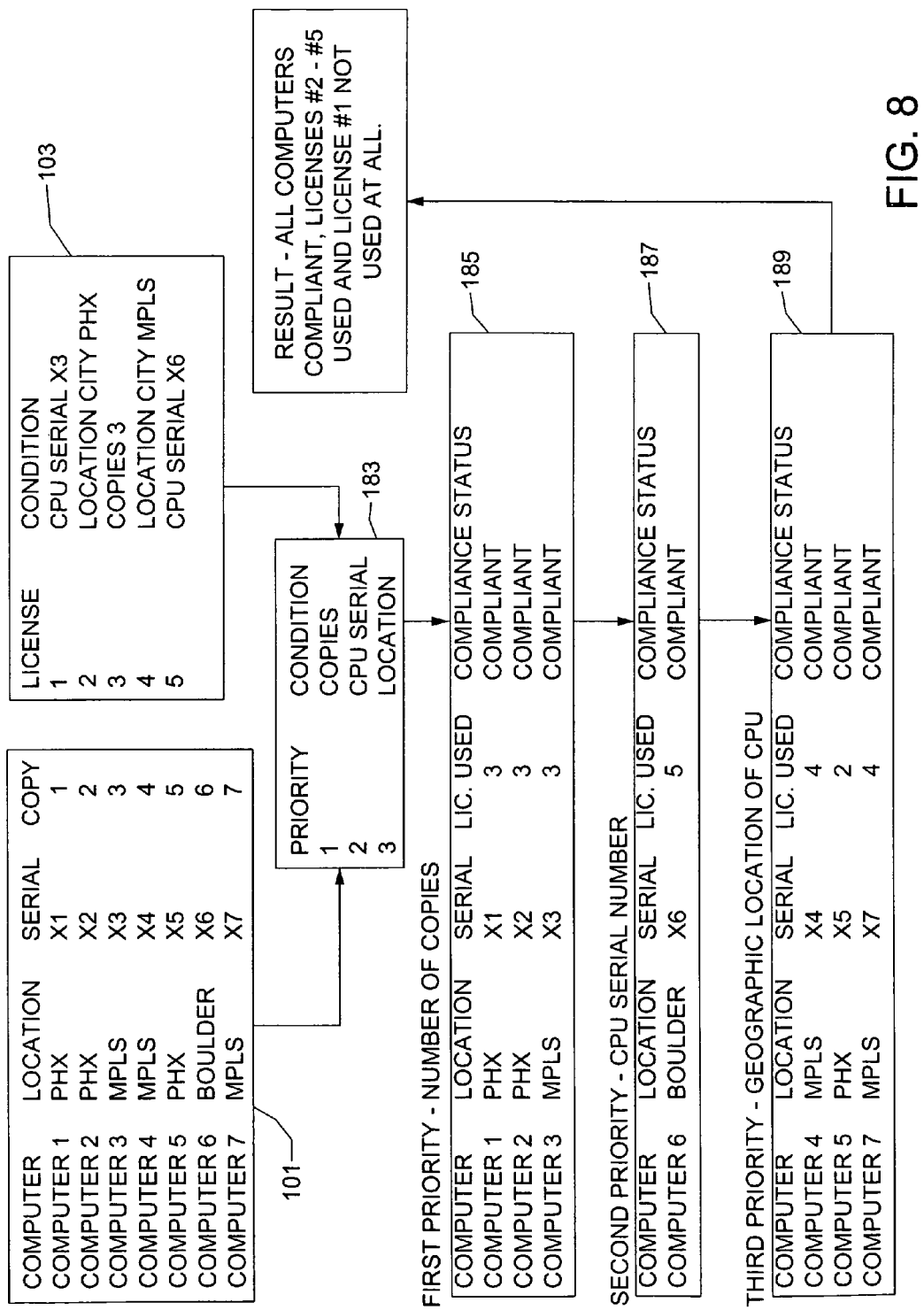
FIG. 8 illustrates tables and other data generated during a sixth iteration of the flow chart of FIGS. 2(A) and 2(B) representing a sixth order of conditions of software licenses.

Sixth Order of Conditions and Sixth Iteration of Program 22—FIG. 8

Next, program 22 determines that there is another order in which to test the conditions (decision 140, yes branch). Consequently, program 22 identifies the last order (step 106), in this example, (1) total number of copies under Number-of-Copies license(s), (2) computer CPU serial number, and (3) geographic location of computer CPU. Program 22 records this order in a table 183 of FIG. 8. Then, program 22 repeats the foregoing steps 110-128 (a sixth time) with this new order of conditions.

In the sixth iteration of step 110, program 22 identifies from file 103 that license #3 has a condition or restriction on the total number of copies that can be made of the software program ABC in Number-of-Copies license(s). In the illustrated example, according to Number-of-Copies license #3, the total number of copies that can be made is three. Also in step 110, program 22 identifies from file 101 one or more of the computers that have the software program installed (and have a total of three copies installed, based the limit in license #3 is three copies). In the illustrated example, computer CPU serial numbers X1, X2 and X3 have the software program ABC installed, and each has one copy installed for a total of three copies. This fully utilizes or consumes license #3. So, program 22 makes entries in table 185 to indicate that computer serial numbers X1, X2 and X3 are compliant with license #3 and that license #3 has been used (step 111). (If instead, computer serial number X1 had two copies installed and computer serial number X2 had one copy installed, then program 22 would only list computer serial numbers X1 and X2 in table 185, because these two computers would consume license #3.)

Next, in the sixth iteration of step 120, program 22 considers the second condition, and determines from file 103 that license #1 is for computer CPU serial number X3. However, program 22 determines from table 185 that computer CPU serial number X3 was already considered licensed under license #3. Consequently, program 22 does not enter license #1 in a Second Priority—Computer CPU Serial Number" table 189 and will deem license #1 as excessive, because it is not needed to license computer CPU serial number X3. Also in the sixth iteration of step 120, program 22 determines from file 103 that license #5 is for computer CPU serial number X6. Program 22 also determines that computer CPU serial number X6 was not considered licensed under a previous license. Consequently, program 22 enters license #5 in a "Second Priority—Computer CPU Serial Number" table 189 (step 121).

Next, program 22 considers the third condition of the sixth iteration, the geographic location of the software program ABC (step 116). Thus, program 22 determines from file 103 that licenses #2 and #4 permit an unlimited number of computers to have copies in Phoenix and Minneapolis, respectively, and an unlimited number of copies in Phoenix and Minneapolis, respectively. Program 22 also determines from file 101 that computer CPU serial numbers X1, X2 and X5 are located in Phoenix, and computer CPU serial numbers X3, X4 and X7 are located in Minneapolis. However, computers X1, X2 and X3 were previously considered licensed under licenses #3. So, program 22 enters computer serial number X4, X5 and X7 into a "Third Priority—Geographic Location" table 187 as being licensed under licenses #2 and #4, and also enters the fact that licenses #2 and #4 have been used (step 117). (Compared to the orders of FIGS. 3, 4 and 5, the order of FIG. 8 provides much lesser utilization of licenses #2 and #4.)

Next, program 22 checks if all the computers listed in table 101 are listed in the tables 185, 187 and 189 (step 124). If not (decision 126, no branch), then such computers are noncompliant, i.e. their software is not licensed. In such a case, program 22 notifies the user that either the software should be deleted or a new license should be obtained for the software on such noncompliant computer(s) (step 127). If all the computers are compliant, which is the case in the illustrated example (decision 126, yes branch) or after step 127, program 22 calculates the license fees that can be saved by terminating each license that is deemed completely excessive, i.e. not used at all, based on the first ordering (step 128). Program 22 makes this calculation by comparing the licenses listed in file 103 to those listed in tables 185, 187 and 189. If any of the licenses listed in file 103 are not listed in any of the tables 185, 187 or 189, then such licenses are deemed completely excessive based on the sixth order of conditions. License #1 is not listed in any of the tables 185, 187 or 189, and therefore, license #1 is completely excessive in this order of conditions, and its license fee can be avoided by termination of license #1. Also, program 22 estimates the license fee saved by each Number-of-Copies license, if any, that can be reduced in scope, i.e. reduced in total number of copies licensed, based on the first ordering (step 128). There are no such licenses in the illustrated example because license #3 has been fully consumed. Then, program 22 totals the potential license fee savings by terminating license #1 based on the sixth order of conditions (step 128).

Identification of Lowest Cost Set of Licenses

Next, program 22 determines that there are no other orders in which to test the conditions (decision 140, no branch). Consequently, program 22 determines which ordering of licenses and license scopes yields the most cost savings by comparing the results of the six iterations of step 128 to each other (step 190). Program 22 also identifies the corresponding set of licenses and license #3 scope and identifies the noncompliant computers, if any, for this ordering (step 190). Program reports these results to the user.

Program 22 can be loaded into computer 10 from a computer storage medium such as magnetic disk or tape, CD ROM, DVD or the like, or downloaded via the Internet via TCP/IP adapter card 20.

Based on the foregoing, a system, method and program product for identifying unutilized or under utilized software licenses have been disclosed. However, numerous modifications and substitutions can be made without deviating from the scope of the present invention. For example, new conditions permitting use on certain days of the week or month, or installation on computers manufactured in certain countries could be handled within the current scope of the present invention. Therefore, the present invention has been disclosed by way of illustration and not limitation, and reference should be made to the following claims to determine the scope of the present invention.

The invention claimed is:
1. A method for identifying at least one of a multiplicity of software licenses which are not needed by an entity, each of the multiplicity of software licenses licensing a same type of software to the entity, the method comprising the steps of:

creating, by a computer, a first sequence of software licenses based on a first order of types of installations or usage conditions of the software licenses, wherein the first sequence contains multiple software licenses;

determining, by the computer, which installations or usages of the software match installation or usage conditions in an initial software license in the first sequence of the software licenses;

determining, by the computer, which installations or usages of the software do not match the installation or usage conditions in the initial software license in the first sequence;

determining, by the computer, from installations or usages of the software that do not match the installation or usage conditions in the initial software license in the first sequence, which installations or usages of the software match installation or usage conditions in a next one of the software licenses in the first sequence;

determining, by the computer, whether all installations or usages of the licensed software, by the entity, match installation or usage conditions in a prior software license located in in the first sequence;

determining, by the computer, whether at least one subsequent software license remains in the first sequence;

creating, by the computer, a second sequence of the software licenses based on a second order of types of installations or usage conditions of the software licenses, wherein the second sequence contains multiple software licenses;

determining, by the computer, which installations or usages of the software match the installation or usage conditions in an initial software license in the second sequence of the software licenses;

determining, by the computer, which installations or usages of the software do not match the installation or usage conditions in the initial software license in the second sequence;

determining, by the computer, from installations or usages of the software that do not match the installation or usage conditions in the initial software license in the second sequence, which installations or usages of the software match installation or usage conditions in a next one of the software licenses in the second sequence;

determining, by the computer, whether all installations or usages of the licensed software, by the entity, match installation or usage conditions in a prior software license located in in the second sequence; and determining, by the computer, whether at least one subsequent software license remains in the second sequence.

2. The method as set forth in claim 1, further comprising the subsequent steps of:

determining, by the computer, a cost savings that occurs by terminating the at least one subsequent software license in the first sequence; and determining, by the computer, a cost savings that occurs by terminating the at least one subsequent software license in the second sequence.

3. The method as set forth in claim 2, further comprising the step of:

comparing, by the computer, the cost savings that occurs by terminating the at least one subsequent software license in the first sequence to the cost savings that occurs by terminating the at least one subsequent software license in the second sequence.

4. A method as set forth in claim 1, wherein each of the usage conditions is selected from a group consisting of: a geographic location of a specified CPU on which the licensed software can be installed or used, a total number of copies of the licensed software that can be installed or used, and the specified CPU on which the licensed software can be installed or used.

5. The method as set forth in claim 1, wherein the initial software license in the first sequence of the software licenses has a usage condition on a geographic location of a specified CPU on which the licensed software can be installed or used.

6. The method as set forth in claim 5, wherein the initial software license in the first sequence of the software licenses has a usage condition on a total number of copies of the licensed software that can be installed or used on the specified CPU on which the licensed software can be installed or used.

7. The method as set forth in claim 1, wherein one of the prior software licenses in the first sequence licenses a fixed number of installations or usages greater than one of copies of the licensed software, and determining that all installations or usages of the licensed software, by the entity, match installation or usage conditions in the prior software licenses in the first sequence, further comprises the step of determining, by the computer, whether the fixed number of installations or usages match installation or usage conditions in the one of the prior software licenses.

8. The method as set forth in claim 7, wherein determining that less than the fixed number of installations or usages match installation or usage conditions in the one of the prior software licenses of the first sequence, further comprises the steps of:

determining, by the computer, how much less than the fixed number of installations or usages match installation or usage conditions in the one of the prior software licenses of the first sequence; and notifying, by the computer, an operator that the one of the prior software license licenses of the first sequence is not fully utilized.

9. A method for identifying at least one of a multiplicity of software licenses which are not needed by an entity, each of the multiplicity of software licenses licensing a same type of software to the entity, the method comprising the steps of:

creating, by a computer, a plurality of sequences of software licenses based on a plurality of orders of types of installations or usage conditions of the software licenses, wherein each of the plurality of sequences contain multiple software licenses;

determining, by the computer, for each of the plurality of sequences of the software licenses which installations or usages of the software match installation or usage conditions in an initial software license of the respective sequence of the software licenses;

determining, by the computer, for each of the plurality of sequences which installations or usages of the software do not match the installation or usage conditions in the initial software license in the respective sequence;

determining, by the computer, from installations or usages of the software that do not match the installation or usage conditions in the initial software licenses in the respective sequences, which installations or usages of the software match installation or usage conditions in a next one of the software licenses in the respective sequences; and determining, by the computer, for each of the plurality of sequences whether all installations or usages of the software, by the entity, match installation or usage conditions in prior software licenses in the respective sequence and there is at least one subsequent software license in the respective sequence.

10. The method as set forth in claim 9, further comprising subsequent steps of:
determining, by the computer, a cost savings that occurs by terminating the at least one subsequent software license in each of the plurality of sequences.

11. A method as set forth in claim 10, further comprising the step of:
comparing, by the computer, the cost savings that occurs by terminating the at least one subsequent software license in each of the plurality of sequences to each other.

12. The method as set forth in claim 9, wherein each of the usage conditions is selected from a group consisting of: a geographic location of a specified CPU on which the licensed software can be installed or used, a total number of copies of the licensed software that can be installed or used, and the specified CPU on which the licensed software can be installed or used.

13. The method as set forth in claim 9 wherein, the initial software license of each sequence of software licenses has a usage condition on a geographic location of a specified CPU on which the licensed software can be installed or used.

14. The method as set forth in claim 13, wherein the initial software license of each sequence of software licenses has a usage condition on a total number of copies of the licensed software that can be installed or used on the specified CPU on which the licensed software can be installed or used.

15. The method as set forth in claim 9, wherein one of the prior software licenses in each sequence of the plurality of sequences of licenses includes a fixed number of installations or usages greater than one of copies of the licensed software, and determining that all installations or usages of the licensed software, by the entity, match installation or usage conditions in the prior software licenses in each sequence, further comprises the step of determining, by the computer, whether the fixed number of installations or usages match installation or usage conditions in the one of the prior software licenses.

16. The method as set forth in claim 15, wherein determining that less than the fixed number of installations or usages match installation or usage conditions in the one of the prior software licenses, further comprises the steps of:
determining, by the computer, how much less than the fixed number of installations or usages match installation or usage conditions in the one of the prior software licenses: and
notifying, by the computer, an operator that the one of the prior software licenses is not fully utilized.

17. A non-transitory medium, containing stored instructions, when executed by a processor, causes the processor to perform the steps of:
creating a first sequence of software licenses based on a first order of types of installations or usage conditions of the software licenses, wherein the first sequence contains multiple software licenses;
determining which installations or usages of the software match installation or usage conditions in an initial software license in the first sequence of the software licenses;
determining which installations or usages of the software do not match the installation or usage conditions in the initial software license in the first sequence;
determining from installations or usages of the software that do not match the installation or usage conditions in the initial software license in the first sequence, which installations or usages of the software match installation or usage conditions in a next one of the software licenses in the first sequence;
determining whether all installations or usages of the licensed software, by the entity, match installation or usage conditions in a prior software license located in the first sequence;
determining whether at least one subsequent software license remains in the first sequence;
creating a second sequence of the software licenses based on a second order of types of installations or usage conditions of the software licenses, wherein the second sequence contains multiple software licenses;
determining which installations or usages of the software match the installation or usage conditions in an initial software license in the second sequence of the software licenses;
determining which installations or usages of the software do not match the installation or usage conditions in the initial software license in the second sequence;
determining from installations or usages of the software that do not match the installation or usage conditions in the initial software license in the second sequence, which installations or usages of the software match installation or usage conditions in a next one of the software licenses in the second sequence;
determining whether all installations or usages of the licensed software, by the entity, match installation or usage conditions in a prior software license located in in the second sequence; and
determining whether at least one subsequent software license remains in the second sequence.

18. The non-transitory computer readable medium of claim 17, comprising the steps of:
determining a cost savings that occurs by terminating the at least one subsequent software license in the first sequence; and
determining a cost savings that occurs by terminating the at least one subsequent software license in the second sequence.

19. The non-transitory computer readable medium of claim 18, comprising the steps of:
comparing the cost savings that occurs by terminating the at least one subsequent software license in the first sequence to the cost savings that occurs by terminating the at least one subsequent software license in the second sequence.

* * * * *